United States Patent
Diewald et al.

(10) Patent No.: US 9,354,876 B2
(45) Date of Patent: May 31, 2016

(54) PROCESSOR WITH EXECUTION UNIT WAIT CONTROL

(71) Applicant: TEXAS INSTRUMENTS DEUTSCHLAND GMBH, Freising (DE)

(72) Inventors: Horst Diewald, Freising (DE); Johann Zipperer, Unterschleissheim (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 427 days.

(21) Appl. No.: 13/917,816

(22) Filed: Jun. 14, 2013

(65) Prior Publication Data

US 2014/0372729 A1    Dec. 18, 2014

(51) Int. Cl.
*G06F 9/32* (2006.01)
*G06F 9/30* (2006.01)
*G06F 9/38* (2006.01)

(52) U.S. Cl.
CPC .......... *G06F 9/30079* (2013.01); *G06F 9/3869* (2013.01); *G06F 9/3889* (2013.01)

(58) Field of Classification Search
CPC ........................................................ G06F 9/32
See application file for complete search history.

(56) References Cited

U.S. PATENT DOCUMENTS 5,390,305 A * 2/1995 Takahashi ................. G06F 9/28
                                                    712/212

* cited by examiner

*Primary Examiner* — Cheng-Yuan Tseng
(74) *Attorney, Agent, or Firm* — John R. Pessetto; Frank D. Cimino (57) ABSTRACT

A processor includes a processor core. The processor core includes a first execution unit and a second execution unit. The first execution unit is configured to 1) execute a complex instruction that requires multiple instruction cycles to execute; 2) generate a wait signal that when asserted suspends execution of instructions by the second execution unit for at least a portion of the execution of the complex instruction; and 3) maintain information defining parameters of the wait signal generation across interruption of the complex instruction by execution of a different instruction in the first execution unit.

8 Claims, 4 Drawing Sheets

PROCESSOR WITH EXECUTION UNIT WAIT CONTROL

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor providing wait control over execution units and various other processor components is disclosed herein. In one embodiment, a processor includes a processor core. The processor core includes a first execution unit and a second execution unit. The first execution unit is configured to 1) execute a complex instruction that requires multiple instruction cycles to execute; 2) generate a wait signal that when asserted suspends execution of instructions by the second execution unit for at least a portion of the execution of the complex instruction; and 3) maintain information defining parameters of the wait signal generation across interruption of the complex instruction by execution of a different instruction in the first execution unit.

In another embodiment, a processor includes a processor core. The processor core includes a plurality of execution units. A first of the execution units is configured to suspend execution of instructions responsive to reception of a first wait signal by the first execution unit, and to execute instructions of an interrupt service while instruction execution is suspended responsive to the first wait signal.

In a further embodiment, a processor includes an execution unit and a hardware component external to the execution unit. The execution unit is configured to: 1) execute a complex instruction that requires multiple instruction cycles to execute; 2) generate a wait signal that when asserted suspends operation of the hardware component for at least a portion of the execution of the complex instruction; and 3) maintain information defining parameters of the wait signal generation across interruption of the complex instruction by execution of a different instruction in the execution unit.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Execution units implemented in various processor architectures may require one or more instruction cycles to execute an instruction. For example, a reduced instruction set architecture may execute simple instructions in a single instruction cycle, while a complex instruction set architecture may execute complex instructions in a plurality of instruction cycles. Inclusion of execution units configured to execute complex instructions allows for efficient provision of complicated functionality. However, in applications requiring timely response to interrupts, such as real-time embedded applications, execution of complex instructions, which may require thousands of instruction cycles to execute, can substantially degrade real-time performance because interrupts are conventionally recognized at instruction boundaries.

Embodiments of the processor disclosed herein include a plurality of execution units configured to execute different instructions in parallel. Embodiments of the execution units may execute complex instructions that require multiple (e.g., thousands) cycles to execute. To facilitate real-time processing, embodiments are configured to suspend execution of a complex instruction, execute a different instruction, and resume execution of the complex instruction after executing the different instruction. However, in some situations, suspension of the complex instruction may be detrimental to overall processor performance. For example, the time to save and restore execution context of the complex instruction may be greater than the time remaining to complete execution of the complex instruction.

Embodiments of the processor disclosed herein improve overall performance by providing wait control that allows one component (e.g., an execution unit) to suspend operation of a different component of the processor for an interval. For example, a first execution unit may suspend at least some operations of an instruction source (e.g., a different execution unit) based on the time to interrupt an instruction being executed by the first execution unit being greater than the time to complete execution of the instruction. Wait control is applicable to a variety of components, including peripherals in communication with an execution unit, and wait assertion, and parameters thereof, may be controlled via instructions and/or processor hardware mechanisms such as state machines.

Figure 1:
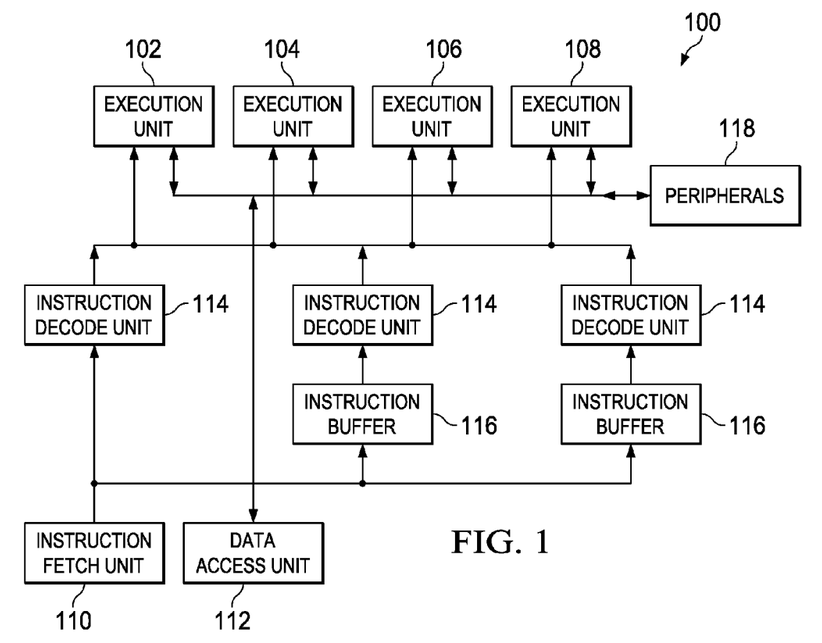
FIG. 1 shows a block diagram of a processor in accordance with various embodiments.

FIG. 1 shows a block diagram of a processor 100 in accordance with various embodiments. The processor 100 includes a plurality of execution units 102, 104, 106, 108. Other embodiments may include one or more execution units. The processor 100 also includes an instruction fetch unit 110, a data access unit 112, and one or more instruction decode units 114. Some embodiments further include one or more instruction buffers 116. In some embodiments of the processor 100, two or more of the execution units 102-108 may be components of a single processor core. Some embodiments of the processor 100 also include peripherals 118. The peripherals 118 may include components that operate in conjunction with the execution units to perform a processing operation. For example, the peripherals 118 may include data storage resources, such as random access memory, communication components, timers, analog-to-digital converters, clock generators, debug logic, voltage references, etc.

One or more of the execution units 102-108 can execute a complex instruction. For example, an execution unit 102-108 may be configured to execute a fast Fourier transform (FFT), execute a finite impulse response (FIR) filter, solve a trigonometric function, evaluate a polynomial, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may be stalled until the execution unit 104 has produced the required result. One execution unit, e.g., a primary execution unit, may provide instructions to, or otherwise control the instruction execution sequence of, other execution units.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. As shown in FIG. 1, multiple execution units may receive decoded instructions from an instruction decoder 114. In some embodiments, an instruction decoder 114 may be dedicated to one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, and instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100). Some embodiments of the processor 100 may include more than one data access unit 112, where each data access unit 112 may be coupled to one or more of the execution units 102-108.

The execution units 102-108 may be configured to execute the same instructions, or different instructions. For example, given an instruction set that includes all of the instructions executable by the execution units 102-108, in some embodiments of the processor 100, all of the execution units 102-108 may be configured to execute all of the instructions of the instruction set. Alternatively, some execution units 102-108 may execute only a sub-set of the instructions of the instruction set. At least one of the execution units 102-108 is configured to execute a complex instruction that requires a plurality of instruction cycles to execute.

Each execution unit 102-108 is configured to control access to the resources of the processor 100 needed by the execution unit to execute an instruction. For example, each execution unit 102-108 can enable power to an instruction buffer 116 if the execution unit is to execute an instruction stored in the instruction buffer 116 while other instruction buffers, and other portions of the processor 100, remain in a low power state. Thus, each execution unit 102-108 is able to independently control access to resources of the processor 100 (power, clock frequency, etc.) external to the execution unit needed to execute instructions, and to operate independently from other components of the processor 100.

To improve processing efficiency, various components of the processor 100 may generate or receive a wait signal that controls the operation of a component receiving the wait signal. In various embodiments, an execution unit 102-108, an instruction buffer 116, a peripheral 118, etc. may generate or receive a wait signal. The generation of a wait signal can be triggered by an instruction and/or hardware in the processor 100 (execution unit hardware, peripheral hardware, etc.) For example, an instruction buffer 116 or one of the peripherals 118 may assert a wait signal directed to execution unit 104 to synchronize operation of the execution with an operation or condition of the buffer or peripheral. Similarly, an execution unit may assert a wait signal directed to a peripheral or a different execution unit to control or synchronize operation of the peripheral/different execution unit with the execution unit asserting the wait signal.

Figure 2:
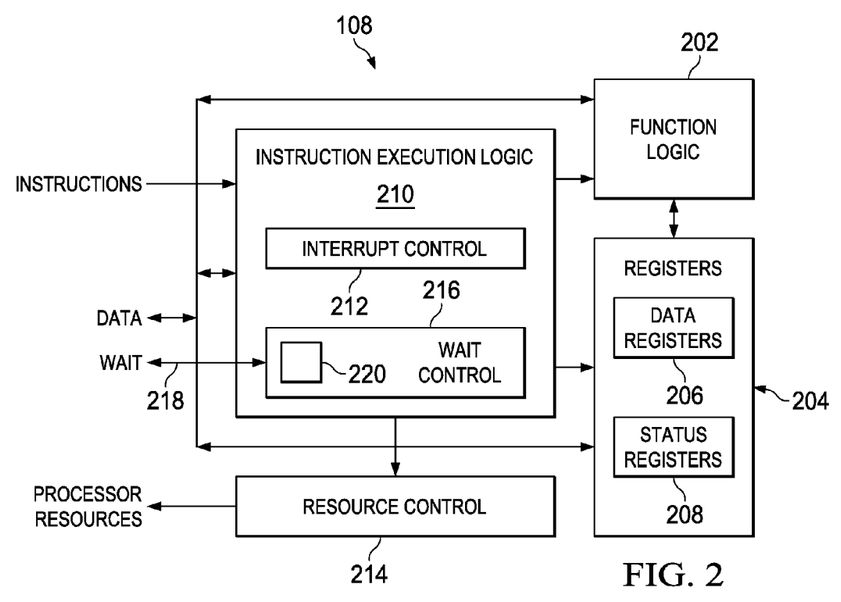
FIG. 2 shows a block diagram for an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands to be processed by, and results produced by, the function logic 202. The number and/or size of registers included in the data registers 206 may vary across embodiments. For example, one embodiment may include 16 16-bit data registers, and another embodiment may include a different number and/or width of registers. The status registers 208 include one or more registers that store state/status information produced by operations performed by the execution unit 108, such as function logic 202, and/or store instruction execution and/or execution unit state information. State information stored in a status register 208 may include a zero result indicator, a carry indicator, result sign indicator, overflow indicator, interrupt enable indicator, instruction execution state, etc. Instruction execution state reflects the current state or progress of execution of an instruction. Instruction execution state may be saved as part of interrupt service initiation and restored as part of interrupt service termination. During instruction execution, the progress and correct execution of an instruction can be verified by inspection of the instruction execution state via a debug environment.

More specifically, wait information, information extracted from a wait field of an instruction or associated with generation of or response to a wait signal by the execution unit may be stored in a status register 208. Accordingly, state of the execution unit 108 associated with generation or reception of a wait signal may be saved with the status register 208 at interrupt service initiation and restored at interrupt service completion thereby preserving the wait signal conditions across interrupts. The wait information stored in a status register 208 may specify wait signal initiation causes and/or timing, wait interval duration, wait interval termination causes and/or timing, wait assertion effects, etc.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control device that sequences the multiple successive operations of a complex instruction being executed by the execution unit 108. In some embodiments, such state machines, as part of or in conjunction with the wait control logic 216 described below, may be arranged to cause assertion a wait signal as part of instruction execution, where the parameters of the wait signal are static or dynamically programmable (e.g., via instructions executed prior to the instruction during which the wait signal is asserted).

The instruction execution logic 210 includes interrupt control logic 212 that allows complex instructions executing in the execution unit 108 to be interrupted. The interrupt control logic 212 detects conditions, such as an interrupt event or reception of an instruction to be executed, that dictate interruption of a currently executing complex instruction. Responsive to detection of such a condition, the interrupt control logic 212 may cause the instruction execution logic 210 to suspend execution of the complex instruction and store in the registers 204, or other storage resource (e.g., a memory), information indicative of the state of the execution unit 108 at the point of suspension of execution (e.g., status register values, relevant data values, instruction execution sequence information, etc.). When the complex instruction execution state information has been saved, the instruction execution logic 210 sequences the execution unit 108 through the operations of a first interrupt service instruction, and any subsequent interrupt service instructions. On completion of the interrupt service, the instruction execution logic 210 restores the saved complex instruction execution state information to the registers 204 and the instruction execution logic 210, and resumes execution of the interrupted complex instruction.

The instruction execution logic 210 also includes wait control logic 216. The wait control logic 216 controls the generation of a wait signal 218 by the execution unit 108, and response of the execution unit 108 to a received wait signal. Assertion of the wait signal 218 by the execution unit 108 may affect the operation of (e.g., halt) the execution unit 108 or any other execution unit, instruction source, or component to which the wait signal is directed. The wait control logic 216 may generate a wait signal responsive to a wait field value of an instruction being executed. In some embodiments, the wait control logic 216 may generate a wait signal based on a trigger other an instruction field, or based on operations encoded in the logic for execution of the instruction where the instruction is identified by an instruction identifier or opcode value. For example, with no wait trigger or wait information provided from an instruction, the wait logic 216 may trigger generation of a wait signal (e.g., based on execution state of an instruction). Thus, embodiments of the wait control logic 216 may selectably generate a wait signal 218 based on instruction and/or hardware triggers.

The wait control logic 216 may assert the wait signal 218 based on a current instruction being near (e.g., within a predetermined time or number of cycles of) completion, or based on context change caused by interruption of the current instruction taking longer to complete than the remainder of the instruction. In such instances, assertion of the wait signal may cause an instruction source to refrain from providing instructions to the execution unit 108 during the wait interval or cause other components of the processor 100 to prepare power, clocks, etc. for execution of a next instruction. In some embodiments of the wait control logic 216, assertion of the wait signal may be triggered by scarcity of execution unit resources. For example, because context storage/restoration time is tied to the number of registers saved, use of more than a specified number of registers in an execution unit to execute an instruction may trigger assertion of a wait signal to an instruction source, thereby inhibiting interruption of the instruction.

The wait signal 218 may include one or more bits or signals that convey wait information for implementing a wait interval. For example, the wait signal 218 may specify whether and when a wait interval is to be initiated or terminated, what actions are to be performed by the receiver of the wait signal, etc. The wait signal may specify that instruction execution in the receiver of the wait signal is to halt during the wait interval, that instruction provision to a specified execution unit is to halt during the wait interval, that component operation is to modified (e.g., component power mode changed, clock mode changed) during the wait interval, etc. Halting of instruction execution responsive to the wait signal may be conditioned on factors specified by the wait information. For example, an execution unit 102 may be halted if it is to issue an instruction to an execution unit 108 asserting a wait signal, or if the execution unit 102 requires a value to be provided by the execution unit 108. Barring occurrence of such conditions, the execution unit 102 may proceed to execution instructions. Wait information may also be transferred via a parallel or serial bus of the processor 100 in conjunction with wait signal 218 or stored in registers or memory for access by a component receiving the wait signal.

Modifications of operation that may be performed in conjunction with the wait signal include changes in power mode (change voltage level, power off/on etc.), changes in clock mode (reduce/increase clock frequency), and execution modification (continue execution, execute specified instructions or instructions at a specified location, etc.). The information applied in conjunction with the wait signal may be varied by applying the information encoded in the wait signal or otherwise known to the receiver to address or retrieve control information from a table of width "N" that stores control information to be applied in conjunction with the wait signal. For example, three bits of the wait signal can select from eight programmable control sets each including any number of control bits that define the effects of the wait signal.

The wait control logic 216 may also include a watchdog timer 220. The watchdog timer 220 may generate a timing event that triggers initiation or termination of a wait interval, or allows for safety monitoring of a wait interval. Watchdog timer expiration may request response from the execution unit 108, a different execution unit, or another component of the processor 100 to process the timer event.

The execution unit 108 also includes resource control logic 214. The resource control logic 214 requests access to the various resources (e.g., storage, power, clock frequency, etc.) of the processor 100 that the execution unit 108 uses to execute an instruction. By requesting processor resources independently for each execution unit 102-108, the power consumed by the processor 100 may be reduced by placing only components of the processor 100 required for instruction execution by an active execution unit 102-108 in an active power state. Furthermore, execution units 102-108 not executing instructions may be placed in a low-power state to reduce the power consumption of the processor 100.

Figure 3:
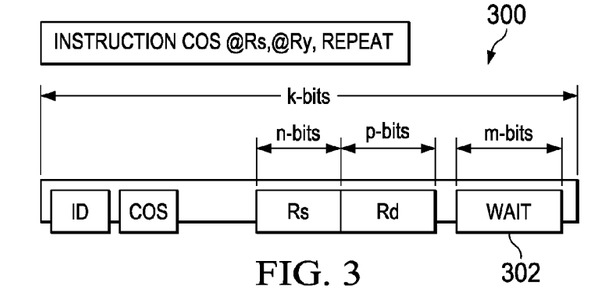
FIG. 3 shows an exemplary instruction that includes wait information in accordance with various embodiments.

FIG. 3 shows an exemplary instruction 300 that includes a wait field 302 in accordance with various embodiments. Some instructions may include a plurality of wait fields 302. The wait field 302 may include information that specifies whether a wait signal is to be generated, when a wait signal is to be generated, for what duration a wait signal is it to be generated, to where a wait signal is directed, etc. In some embodiments, such wait information may be specified via other instructions and stored in registers or memory for access by the wait signal generator and/or wait signal receiver. In such embodiments, the wait field 302 may include an address or pointer specifying the location of the wait information.

Parameters of or associated with a wait signal or wait interval, as specified by the wait information, may be defined in various ways. For example, wait interval may be specified to end: after a given time duration, at a predetermined time, after a predetermined number of cycles, on generation of a predetermined status value by an execution unit or other processor component, on entry or exit of a predetermined state by an execution unit, at instruction execution completion, a predetermined time or number of cycles prior to completion of instruction execution, on assertion of a predetermined signal, etc. Similarly, a wait interval may be specified to begin: at start of instruction execution, a predetermined time or number of cycles after start of instruction execution, on generation of a predetermined status value by an execution unit or other processor component, on entry or exit of a predetermined state by an execution unit, on assertion of a predetermined signal, etc. Thus, a wait interval can be initiated at any time during instruction execution and terminated at any time thereafter.

Figure 4:
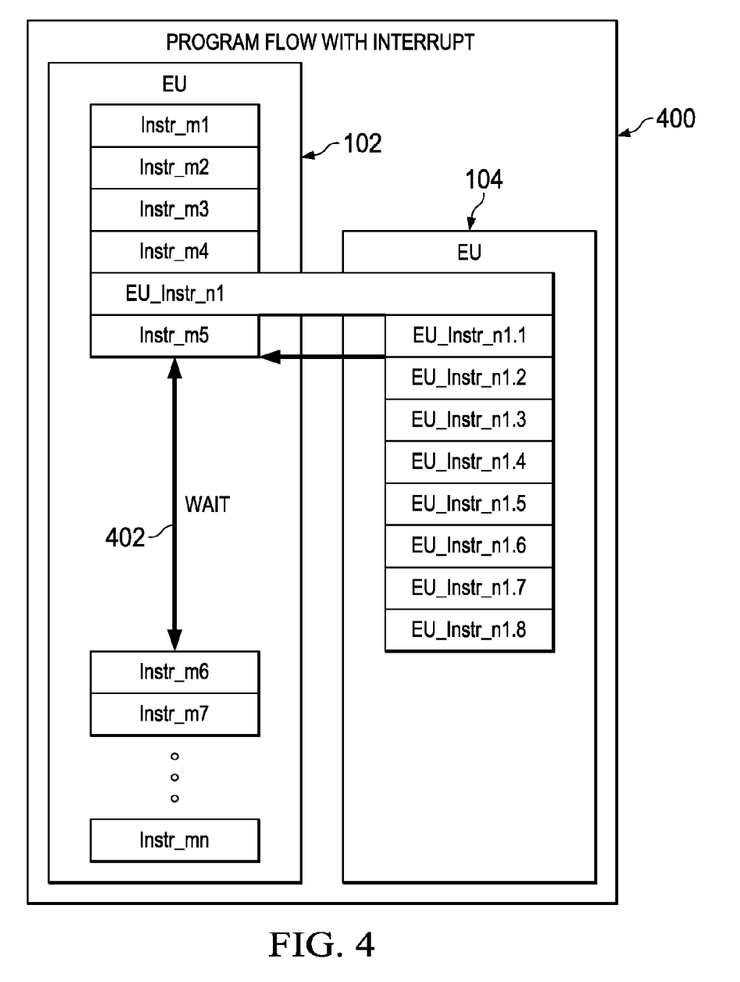
FIGS. 4 and 5 show exemplary instruction flows incorporating wait control in accordance with various embodiments.

FIG. 4 shows an exemplary instruction flow 400 in the processor 100 incorporating wait control in accordance with various embodiments. In the instruction flow 400, the execution unit 102 (EU 102) fetches instructions Instr_m1 to Instr_m4 to be processed in EU 102. Thereafter, EU 102 fetches instruction EU1_Instr_n1 and passes EU1_Instr_n1 to execution unit 104 (EU 104) for execution. EU 104 initiates execution of EU1_Instr_n1 and at execution state EU1_Instr_n1.1, the wait control logic 216 of EU 104 asserts a wait signal directed to EU 102. The assertion may be responsive to a wait field 302 in the instruction, or the execution logic 210 may be arranged to autonomously generate the wait signal when executing instruction EU1_Instr_n1.1. At the time the wait signal is asserted EU 102 has already fetched Instr_m5. The wait signal logic 216 of EU 102 receives the asserted wait signal and inhibits further instruction fetches by EU 102 during the wait interval 402. With execution state EU1_Instr_n1.8, EU 104 has completed execution of instruction EU1_Instr_n1, the wait control logic 216 of EU 104 negates the wait signal, and EU 102 operation continues with fetching of instruction Instr_m6.

As shown in the instruction flow 400, fetching of instructions is inhibited during the wait interval 402. In some embodiments of the processor 100, assertion of the wait signal may deactivate or affect other operational changes in components to which the wait signal is directed. For example, clock frequency and/or power to EU 102 may be reduced during the wait interval 402 to reduce overall processor power consumption. Information provided in conjunction with or in anticipation of the wait signal may determine what actions are performed during the wait interval (e.g., stall, power down, reduce voltage, reduce clock rate, etc.) When exiting the wait interval 402, the resources affected by waiting may be activated early to allow the execution unit to resume operation without delay. For example, operational values of voltage and/or clock may be provided to the execution unit prior to termination of the wait interval 402 to allow for EU 102 to resume operation without delays associated with clock/voltage ramp-up.

In some embodiments of the processor 100, an execution unit that is stalled by assertion of a wait signal can service interrupts or other specified service requests during the wait interval. After service is complete, the execution unit will return to the wait condition as specified by the wait information stored in a status register of the execution unit. The priority levels of interrupts serviceable by the execution unit during the wait interval may be specified by wait information stored in the status register of the execution or other storage location. For example, such priority level information may specify that non-maskable interrupts, and/or maskable interrupts, and/or particular interrupts are serviceable or non-serviceable during the wait interval. Servicing of interrupts during the wait interval may require that power, clocks, etc. be restored for the duration of the interrupt service.

Figure 5:
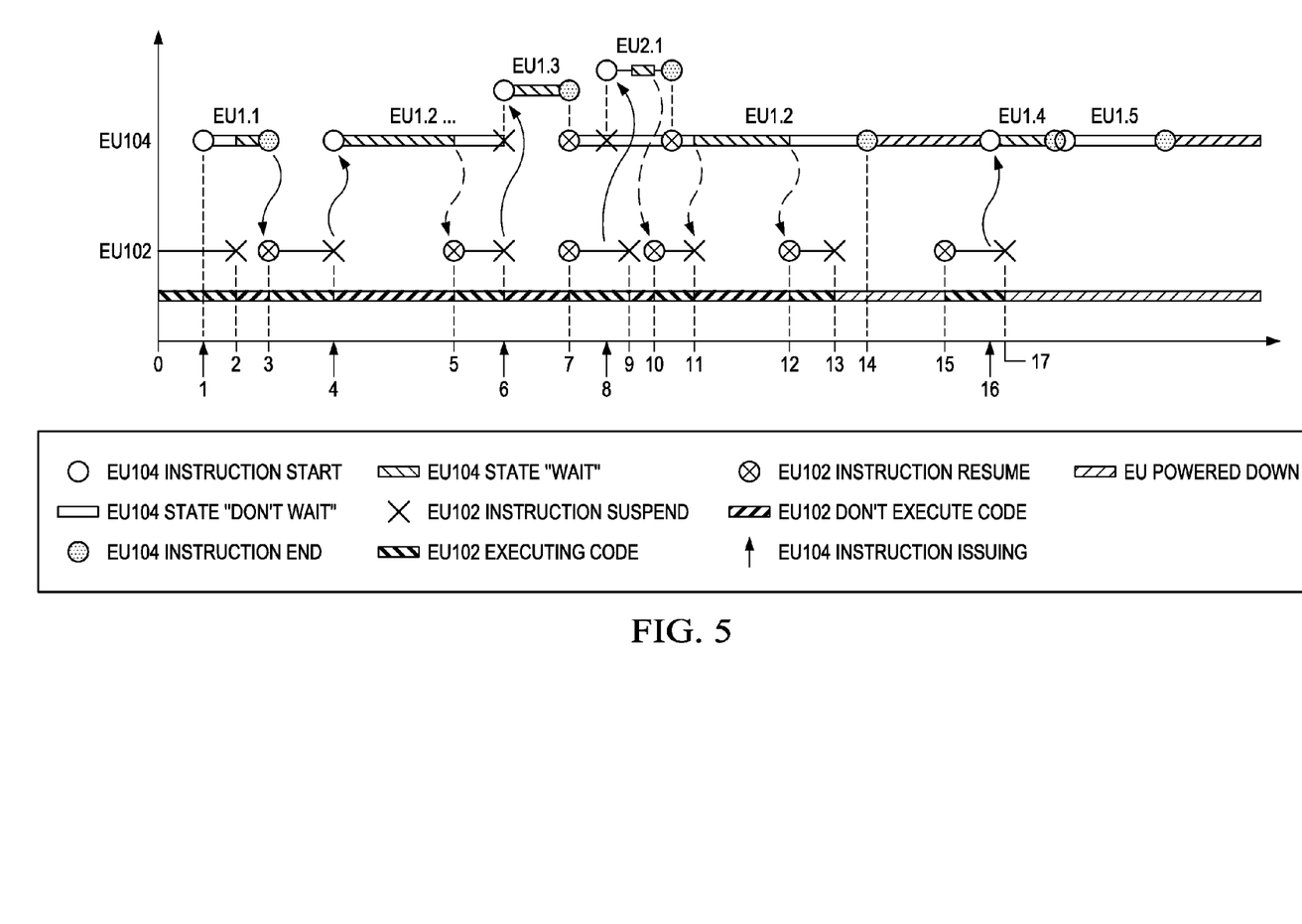

FIG. 5 shows an exemplary instruction flow in the processor 100 incorporating wait control in accordance with various embodiments. At time 0, EU 102 is executing code and EU 104 is idle. At time 1, EU 102 issues an instruction (EU1.1) for execution by EU 104. EU 102 continues to execute code in parallel with execution of EU1.1 by EU 104, until EU 104 asserts a wait signal at time 2 that halts/stalls EU 102. When execution of EU1.1 is complete at time 3, the wait interval terminates and EU 102 resumes execution of code. EU102 issues EU1.2 for execution by EU 104 at time 4. The instruction EU1.2 causes assertion of a wait signal from the start of execution. The wait interval ends at time 5 and EU 102 resumes instruction execution. At time 6, while instruction EU1.2 is still executing, EU 102 issues instruction EU1.3 for execution by EU 104. Issuance of EU1.3 interrupts execution of EU1.2. EU 104 asserts a wait signal directed to EU 102 for the entire execution of instruction EU1.3. The wait interval terminates with completion of EU1.3 execution at time 7, and EU 102 resumes code execution as no wait signal is asserted in conjunction with resumption of EU1.2 execution by EU 104.

At time 8, EU 102 issues instruction EU2.1 for execution by execution unit 106 (EU 106). During the execution of EU2.1, EU 102, EU 104, and EU 106 are executing instructions in parallel. At time 9, while executing instruction EU 2.1, EU 106 asserts a wait signal directed to EU 102, thereby causing EU 102 to halt execution. The wait interval ends at time 10, and EU 102 resumes execution. At time 11, EU 104 asserts a wait signal directed to EU 102 as execution of EU1.2 continues, thereby halting code execution by EU 102. The wait interval terminates at time 12 and EU 102 resumes instruction execution. At time 13, instruction execution in EU 102 causes the EU 102 to transition to an OFF state in which instruction execution is halted and EU 102 may be powered down. While EU 102 is in the OFF state, execution of instruction EU1.2 continues in EU 104 until complete at time 14. At time 15, an event, which may be generated internal to or external to EU 102, awakens EU 102 causing EU 102 to resume code execution. EU 102 issues instructions EU1.4 and EU1.5 for execution by EU 104 at time 16. EU 104 asserts a wait signal and EU 102 transitions to the OFF state at time 17. With completion of instruction EU1.5, EU 104 may also be powered down.

In addition to the inter-execution unit exchange of wait signals described above, an execution unit 102-108 can send a wait signal to and/or receive a wait signal from non-execution unit components of the processor 100. For example, to control provision of instructions to an execution unit, the execution unit can direct a wait signal to an instruction source, such as an instruction buffer 116, which causes the instruction buffer to refrain from providing additional instructions to the execution unit during the wait interval. Similarly, the instruction decode unit 118 can identify a wait field 302 in an instruction and generate a wait signal directed to an execution unit 102-108.

The execution units 102-108 can also interact with the peripherals 118 through wait signals. For example, a wait signal generated by an execution unit 108 can be directed to a peripheral 118 to halt, resume, or change peripheral operation. Similarly, a wait signal generated by a peripheral 118 can be directed to an execution unit to halt, resume, or change instruction execution by the execution unit. For example, a signal generated by a peripheral 118 (or within an execution unit) can be directed an execution unit to execute a preloaded instruction or sequence of instructions.

Figure 6:
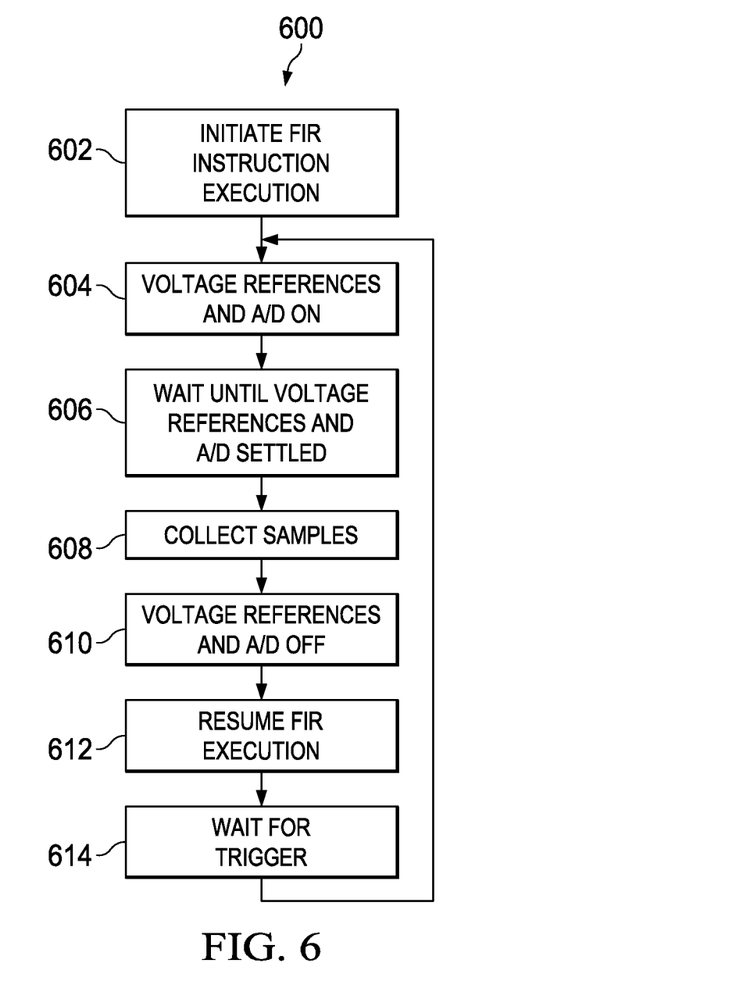
FIG. 6 shows a flow diagram for a method for applying wait control in a processor in accordance with various embodiments.

FIG. 6 shows a flow diagram for a method for applying wait control with peripherals in a processor in accordance with various embodiments. Though depicted sequentially as a matter of convenience, at least some of the actions shown can be performed in a different order and/or performed in parallel. Additionally, some embodiments may perform only some of the actions shown.

In block 602, a complex instruction is issued to an execution unit (e.g., execution unit 104) of the processor 100 for execution. More particularly, a finite impulse response (FIR) filter instruction is issued for execution, though the principles discussed herein are applicable to a variety of instructions that require many instruction cycles to execute.

In block 604, the execution unit 104 asserts one or more signals that enable operation of peripherals 118 used in conjunction with the FIR instruction. For example, the execution unit 104 may enable (e.g., power up) an analog-to-digital converter (A/D) that provides digitized samples of a signal to the execution unit 104, and a voltage reference that provides a reference voltage to the A/D converter. The A/D and voltage reference are enabled only when needed to reduce power consumption. The enabling of the A/D and voltage reference may be controlled by information provided in a wait field 302 of the FIR instruction or by logic of the execution unit that, without or in conjunction with information provided in the wait field 302, enables the A/D and voltage reference when a FIR instruction is executed.

In block 606, the execution unit 104 waits for the voltage reference and A/D to settle after having been enabled. Thus, execution of the FIR instruction is halted for a wait interval. Initiation of the wait interval may be controlled by information provided in a wait field 302 of the FIR instruction, or alternatively by logic of the execution unit, or by logic of a peripheral (e.g., the A/D) that, without or in conjunction with information provided in the wait field 302, suspends instruction execution until the voltage reference and A/D have settled. For example, the wait field 302 or execution unit logic may specify that the execution unit suspend execution for a predetermined time interval or number of cycles, or until a predetermined event is detected after the voltage reference and A/D have been enabled. A timer or counter internal or external to the execution unit may be used to time or cycle count. A predetermined event to terminate the wait interval may be, for example, a signal from the A/D indicating that the A/D and voltage reference have settled. By suspending instruction execution while waiting for the A/D and voltage reference to settle, power consumption of the processor 100 is reduced.

In block 608, the voltage reference and A/D have settled and the wait interval is terminated. The execution unit 104 collects from the A/D samples that are to be filtered. In some embodiments, the execution of the FIR instruction may remain stalled and the samples may be collected by a DMA controller that is triggered by termination of the wait interval.

In block 610, after the samples to be filtered have been collected, the execution unit 104 asserts one or more signals that disable the voltage reference and the A/D.

In block 612, the execution unit 104 resumes execution of the FIR instruction. For example, filter coefficients may be applied to scale the samples, and the samples summed after scaling by the coefficients.

In block 614, the FIR computation is complete and the execution unit 104 waits for a trigger event that initiates further processing. Initiation of the wait interval may be controlled by wait information provided in a wait field 302 of the FIR instruction or by logic of the execution unit that, without or in conjunction with information provided in the wait field 302, suspends instruction execution until addition FIR processing is needed. For example, the wait field 302 or execution unit logic may specify that the execution unit suspend execution for a predetermined time interval or number of cycles, or until a predetermined event is detected. The wait information may further specify that execution resume at a particular sub-state of the FIR instruction. For example, on termination of the wait interval the FIR instruction may restart from the beginning (e.g., sub-state 0) or restart at a sub-state subsequent to the first instruction sub-state (e.g., sub-state>0).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   a processor core, comprising:
   a first execution unit; and
   a second execution unit;
   wherein the first execution unit is configured to:
   execute a complex instruction that requires multiple instruction cycles to execute;
   generate a wait signal that when asserted suspends execution of instructions by the second execution unit for at least a portion of the execution of the complex instruction; and
   maintain information defining parameters of the wait signal generation across interruption of the complex instruction by execution of a different instruction in the first execution unit;
   wherein the second execution unit is configured to provide the complex instruction to the first execution unit.

2. A processor, comprising:
   a processor core, comprising:
   a first execution unit; and
   a second execution unit;
   wherein the first execution unit is configured to:
   execute a complex instruction that requires multiple instruction cycles to execute;
   generate a wait signal that when asserted suspends execution of instructions by the second execution unit for at least a portion of the execution of the complex instruction; and
   maintain information defining parameters of the wait signal generation across interruption of the complex instruction by execution of a different instruction in the first execution unit;
   wherein the wait signal, when asserted, disables one of clocks and power to the second execution unit.

3. A processor, comprising:
   a processor core, comprising:
   a first execution unit; and
   a second execution unit;
   wherein the first execution unit is configured to:
   execute a complex instruction that requires multiple instruction cycles to execute;
   generate a wait signal that when asserted suspends execution of instructions by the second execution unit for at least a portion of the execution of the complex instruction; and
   maintain information defining parameters of the wait signal generation across interruption of the complex instruction by execution of a different instruction in the first execution unit;
   wherein the complex instruction comprises a field that causes the first execution unit to assert the wait signal.

4. The processor of claim 3, wherein the field comprises information specifying at least one of:
   a signal or event in the processor that in conjunction with assertion of the wait signal causes the second execution unit to suspend or resume execution of instructions;
   a number of cycles associated with suspension or resumption of execution;
   a time interval associated with suspension or resumption of execution;
   a state of the processor associated with suspension or resumption of execution;
   a status value of the processor associated with suspension or resumption of execution; and
   a resource that, in conjunction with assertion of the wait signal, generates an event that causes the second execution unit to suspend or resume execution of instructions.

5. A processor, comprising:
   a processor core, comprising:
   a first execution unit; and
   a second execution unit;
   wherein the first execution unit is configured to:
   execute a complex instruction that requires multiple instruction cycles to execute:
   generate a wait signal that when asserted suspends execution of instructions by the second execution unit for at least a portion of the execution of the complex instruction; and
   maintain information defining parameters of the wait signal generation across interruption of the complex instruction by execution of a different instruction in the first execution unit;
   wherein, responsive to at least one of assertion and negation of the wait signal, the processor is configured to:
   change a power mode of the processor;
   change a clock mode of the processor;
   fetch an instruction for execution; or change a configuration of a peripheral;
   wherein the power mode is defined by at least one of:
   the complex instruction;
   an instruction preceding the complex instruction; and
   an instruction succeeding the complex instruction.

6. A processor, comprising:
   a processor core, comprising:
   a plurality of execution units, a first of the execution units is configured to:
   suspend execution of instructions responsive to reception of a first wait signal by the first execution unit; and
   execute instructions of a request service while instruction execution is suspended responsive to the first wait signal;
   further comprising an instruction buffer coupled to the first execution unit, wherein the instruction buffer is configured to assert the first wait signal based on an instruction stored in the instruction buffer comprising a wait field containing information indicating that the first execution unit is to suspend execution of instructions.

7. A processor, comprising:
an execution unit; and
a hardware component external to the execution unit;
wherein the execution unit is configured to:
    execute a complex instruction that requires multiple instruction cycles to execute;
    generate a wait signal that when asserted suspends operation of the hardware component for at least a portion of the execution of the complex instruction; and
maintain information defining parameters of the wait signal generation across interruption of the complex instruction by execution of a different instruction in the execution unit;
    wherein the processor is configured to disable one or more of a clock source and a power supply coupled to the hardware component responsive to assertion of the wait signal.

8. A processor, comprising:
an execution unit; and
a hardware component external to the execution unit;
wherein the execution unit is configured to:
    execute a complex instruction that requires multiple instruction cycles to execute;
    generate a wait signal that when asserted suspends operation of the hardware component for at least a portion of the execution of the complex instruction; and
maintain information defining parameters of the wait signal generation across interruption of the complex instruction by execution of a different instruction in the execution unit;
    wherein the hardware component comprises at least one of an analog to digital converter and a voltage reference.

* * * * *